(12) United States Patent
Seider et al.

(10) Patent No.: US 8,920,527 B2
(45) Date of Patent: Dec. 30, 2014

(54) HIGH PERFORMANCE CERAMIC ABRASIVE GRITS OF UNIFORM THICKNESS AND METHODS OF PRODUCING AND USING THE SAME

(71) Applicant: Washington Mills Management, Inc., Grafton, MA (US)

(72) Inventors: Robert Seider, Ransomville, NY (US); Angelo R. Angelone, Niagara Falls (CA)

(73) Assignee: Washington Mills Management, Inc., North Grafton, MA (US)

( * ) Notice: Subject to any disclaimer, the term of this patent is extended or adjusted under 35 U.S.C. 154(b) by 0 days.

(21) Appl. No.: 13/927,767

(22) Filed: Jun. 26, 2013

(65) Prior Publication Data

US 2013/0288574 A1    Oct. 31, 2013

Related U.S. Application Data

(63) Continuation of application No. 12/157,893, filed on Jun. 13, 2008, now Pat. No. 8,481,438.

(51) Int. Cl.
| | | |
|---|---|---|
| *C09K 3/14* | (2006.01) | |
| *C04B 35/00* | (2006.01) | |
| *B24D 3/28* | (2006.01) | |
| *B24D 11/00* | (2006.01) | |
| *B24C 11/00* | (2006.01) | |
| *B24D 3/00* | (2006.01) | |

(52) U.S. Cl.
CPC ................ *C09K 3/1418* (2013.01); *B24D 3/28* (2013.01); *B24D 11/001* (2013.01); *C09K 3/1409* (2013.01); *B24C 11/00* (2013.01); *B24D 3/00* (2013.01)
USPC .................................. 51/298; 51/307; 501/80

(58) Field of Classification Search
USPC ................ 51/298, 307–309; 501/80, 84, 96.1
See application file for complete search history.

(56) References Cited

U.S. PATENT DOCUMENTS

| | | | |
|---|---|---|---|
| 2,806,772 A | | 9/1957 | Robie |
| 3,806,956 A | * | 4/1974 | Supkis et al. .................. 451/59 |
| 4,110,939 A | * | 9/1978 | Bodolai ......................... 51/298 |
| 4,770,671 A | | 9/1988 | Monroe et al. |
| 4,920,704 A | | 5/1990 | Caserta et al. |

(Continued)

FOREIGN PATENT DOCUMENTS

JP        2005027503 A       2/2005

*Primary Examiner* — Pegah Parvini
(74) *Attorney, Agent, or Firm* — Michael L. Dunn

(57) ABSTRACT

A ceramic abrasive grain product of a ceramic material composition, said ceramic abrasive grain product comprising at least fifty percent of abrasive grains having a uniform grain thickness of from 0.002 to 0.016 inches and a length such that the grain is self dressing when oriented such that the thickness of the grain is exposed to a workpiece, abrasive products made therefrom and method for manufacturing and using same.

3 Claims, 5 Drawing Sheets

(56) References Cited

U.S. PATENT DOCUMENTS

| | | |
|---|---|---|
| 5,035,724 A | 7/1991 | Pukari et al. |
| 5,045,091 A | 9/1991 | Abrahamson et al. |
| 5,077,241 A | 12/1991 | Moh et al. |
| 5,094,672 A * | 3/1992 | Giles et al. ............ 51/309 |
| 5,194,072 A | 3/1993 | Rue et al. |
| 5,201,916 A * | 4/1993 | Berg et al. ............ 51/293 |
| 5,203,886 A | 4/1993 | Sheldon et al. |
| 5,215,552 A | 6/1993 | Sung |
| 5,372,620 A | 12/1994 | Rowse et al. |
| 5,431,704 A | 7/1995 | Tamamaki et al. |
| 5,770,145 A | 6/1998 | Gerk et al. |
| 5,876,470 A | 3/1999 | Abrahamson |
| 6,638,984 B2 | 10/2003 | Soane et al. |
| 6,833,014 B2 | 12/2004 | Welygan et al. |
| 7,294,158 B2 | 11/2007 | Welygan et al. |
| 2004/0144037 A1 | 7/2004 | Carter et al. |
| 2006/0026905 A1 | 2/2006 | Kim |
| 2006/0211342 A1 | 9/2006 | Bonner et al. |

\* cited by examiner

HIGH PERFORMANCE CERAMIC ABRASIVE GRITS OF UNIFORM THICKNESS AND METHODS OF PRODUCING AND USING THE SAME

Cross Reference to Related Applications

This is a Continuation Application of U.S. patent application Ser. No. 12/157,893 filed Jun. 13, 2008 and claims priority therefrom.

BACKGROUND OF THE INVENTION

This invention relates to the production of very low packing density ceramic abrasive grits and methods of making the same from various known abrasive materials such as fused aluminum oxide, co-fused aluminum oxide-zirconium oxide or sintered sol gel aluminum oxide, all of which may or may not contain various supplementary oxides.

A usual abrasive particle can simplistically be represented by a double ended cone, whereby one end of the cone is bonded to the abrasive product base and the other end is contacting the steel workpiece. As the cone wears back from the tip of the cone, the wear flat is increasing in two directions and thus the wear flat area growth rate increases as a squared function of the wear back.

For use in abrasive applications, the above abrasive materials are produced in bulk form and are crushed to the desired grit size for use in coated or bonded abrasive products. Aluminum oxide abrasive can be made by refining bauxite in an arc furnace or by melting a Bayer type alumina in an arc furnace and pouring into large molds for cooling. The crude is then crushed into the desired grit size. Co-fused aluminum oxide zirconium oxide abrasive is also are furnaced, but it is poured into molds which produce very rapid cooling. Such molds may be steel plates with small spacings (about ¼") between them or molds which contain steel balls, whereby the melt flows into the interstitial spaces. This crude is then also crushed into desired grit sizes. Sol gel alumina is made in a water based system, usually extruded, dried, crushed into the desired grit sizes, calcined and fired into abrasive grit particles.

In all of the above, crushing of the bulk material results in particles with a three dimensional shape, whereby the dimensions of the particles in the three axes of the grain are equivalent or nearly equivalent. Abrasive grits for heavy duty bonded applications are desired to have equal axes which indicate a "blocky" material and is indicative of a material with a high packing density. Abrasive grits for paper and cloth applications are desired to have unequal axes which indicate a "sharp" material and is indicative of a material with a lower packing density. The table below illustrates typical packing densities of various bonded and coated abrasive grits.

TABLE I

|  | Packing Density 36 Grit | |
|---|---|---|
|  | Bonded Abrasives g/cm$^3$ | Coated Abrasives g/cm$^3$ |
| Fused Aluminum Oxide | 1.82-1.92 | 1.73-1.82 |
| Sintered Sol Gel Aluminum Oxide | 1.82-1.92 | 1.73-1.82 |
| Co-Fused Aluminum Oxide-Zirconium Oxide | 2.10-2.22 | 1.99-2.10 |

The co-fused aluminum oxide-zirconium oxide particles have similar shapes to the fused aluminum oxide and sintered sol gel particles. The higher packing densities result from the higher true specific gravity of the alumina-zirconia (4.55) versus 3.94-3.92 for the fused aluminum and sol gel alumina.

Generally, the abrasive grits for coated applications are extracted during the initial crushing of the crude material when the abrasive particles are sharper as indicated by a lower packing density. The abrasive grits for some bonded applications are generally further processed by milling or impacting to make the particles more blocky as indicted by a higher packing density. In addition, some bonded applications do require lower packing density or sharper abrasive grits.

Of particular interest are the packing densities of the coated abrasive materials and that they are only slightly lower than the packing densities of the bonded abrasive materials. The coated abrasive packing densities are inherent from crushing a bulk material into abrasive grits. Lower packing density material than shown on the above Table I for coated abrasive applications is desirable but not attainable with the typical crushing of abrasive grits from bulk crude materials. Lower packing density abrasive may be associated with providing a longer life abrasive product in coated applications i.e. a higher total metal removal (cut) until removal rate is unacceptable.

An abrasive disc or belt is discarded when the grinding operator considers that it has become dull, which means the metal removal rate has decreased to approximately 10-20% of the initial metal removal rate. The metal removal rate is a function of the penetration of the abrasive particles into the steel workpiece. The penetration of the particles into the steel is further dependent on the pressure the abrasive grits apply to the steel workpiece. The pressure of the abrasive grits on the steel workpiece is defined by the force of the abrasive particles on the steel divided by the wear flat area of the particles. As the wear flat area of the abrasive particles increases, the abrasive grit pressure applied to the steel workpiece decreases, the abrasive grit penetration decreases and the resulting metal removal rate decreases. When a grinding disc or belt is discarded, the wear flat area is very small, 0.002 in.$^2$ to 0.004 in.$^2$ per square inch of abrasive material, depending on the type and shape of the steel being ground and the force applied to the abrasive products.

The wear flat area of an abrasive particle is dependent on the wear (wear back) of the particle during grinding. As the wear back increases, the wear flat area increases. To improve the useful cutting life of a coated abrasive product, it is necessary to slow the abrasive grit wear flat growth rate. This may be accomplished with an abrasive grain more resistant to wear which results in a slower wear back growth rate and a resulting slower wear flat growth rate. Secondly, the abrasive particle shape can be changed to result in a slower wear flat growth rate as the particle wears back. Thirdly, the shape and consistency of the abrasive particle can be altered so that the abrasive particles with terminal wear flat areas can shed the wear flats and expose a new grinding surface or that the particle can break off below the grinding interface thereby also removing the terminal wear flat. This shedding or break-off phenomenon can be called self dressing. The terminal wear flat area is defined as that area which prevents the abrasive particles from significantly penetrating the steel surface with a particular applied force.

Ceramic hollow spheres (ceramic bubbles) have been known for some time and have many applications, one of which is to lower the density of abrasive products, especially bonded abrasive products. Such bubbles, e.g. alumina or alumina-zirconia bubbles, added to reduce product density generally do not provide sharp edges or corners that significantly improve grinding performance; although, such bubbles may partially or completely fracture during use of the abrasive product which conceivably could have some such effect, albeit minor. Such ceramic bubbles are well known as are their methods of manufacture, e.g. by atomizing fused ceramic material, e.g. fused alumina or alumina-zirconia mix with compressed gas, usually compressed air. Such products are readily available in the industry, e.g. from Washington Mills as DURALAM® hollow ceramic spheres, from Zircar Corporation as ZIRCAR® hollow ceramic spheres or from Treibacher Corporation as ALODUR® hollow ceramic spheres.

Such ceramic bubbles may also be made from other processes such as a sol gel processes as described in U.S. Pat. No. 5,077,241.

It has also been known to introduce ceramic filaments or rods into abrasive products, e.g. as described in U.S. Pat. Nos. 5,194,072; 5,372,620; and 5,876,470 with idea that the end portions of such filaments or rods would retain a certain sharpness. While this may in some respects have validity, use in actual practice can be difficult. This is because to have the appropriate effect, the rods or filaments have to be appropriately oriented, i.e. a side on exposure of such a rod or filament to a work piece does not act as a good cutting edge. Further, the ends of such rods or filaments may not actually have particularly sharp cutting edges since they might be no thinner than the diameter of the rod or filament itself.

BRIEF SUMMARY OF THE INVENTION

It is an object of the present invention to reduce the wear flat growth rate or shed the terminal wear flats and prolong the useful metal removal rate (cutting life) of abrasive products, especially coated abrasive products.

It is a further object of the present invention to provide abrasive grains that are scooped shaped and able to gouge out portions to be removed from a workpiece.

It is a further object of the invention to provide abrasive grains in the form of thin curved sheets that are self sharpening in that they crack or break off as their edges wear to provide new sharp cutting edge surfaces.

It is a further object of the invention to provide abrasive grains that are thin sharp plates having greater strength due to curvature.

It is a further object of the invention to provide abrasive grains having a microcrystalline structure that permits cracking off of edges having wear flats to expose a new sharp face.

The present invention employs flakes and/or fibers to reduce the wear flat area growth rate with wear back. A flake with uniform thickness increases only in one direction with wearback and thus the wear flat area growth rate is a linear function of wearback vs. a squared function for a usual abrasive particle. A fiber does not increase in either direction with wearback and thus the wear flat area is constant with wearback. The wear flat area of a fiber containing abrasive product increases only as additional fibers enter the grinding interface level.

The above objects may be attained by using abrasive grains formed by crushing ceramic bubbles. Such grains are thin plates having a curvature following the curvature of the original ceramic bubble thus resulting in a "scoop" shape. Such a geometric configuration is stronger than a flat plate of the same thickness thus permitting a very thin abrasive edge to be useful without premature cracking yet at the same time fracturing when a wear flat forms, thus permitting more force to be applied to the grain while permitting self sharpening.

The invention further includes the abrasive grains themselves as well as abrasive products incorporating them.

Preferably, in accordance with the invention, a ceramic abrasive grain product of a ceramic material composition is provided. The ceramic abrasive grain product has an average particle size between about 10 and about 1500 micrometers, a particle size distribution wherein over 50 percent by weight of particles have a particle size within a factor of 20 of each other, and a packing density of less than 75 percent of the bulk density of an abrasive grain, having about the same average particle size and particle size distribution of essentially the same ceramic material composition as the ceramic grain product of the invention, that was fused, cooled to a solid mass, and crushed to grain sizes. Essentially all (greater than 90%) of the grains of the invention have a grain thickness less than twenty percent of the particle size.

In another preferred embodiment of the invention, there is provided an abrasive grain material comprising particles having an internal concave surface, an external convex surface and a relatively uniform thickness between the internal and external surfaces, the external surface being of a relatively uniform curvature, which curvature, if extended, would form a contiguous surface essentially spherical in shape. The average particle size of the grain of the invention is between about 10 and about 1500 micrometers. The particles have irregular circumferential edges defined by circumferences of the internal and external surfaces.

DETAILED DESCRIPTION OF THE INVENTION

"Particle size" is the median dimension of the particle. "Average particle size" of the grains of the invention is defined by the average of median dimensions of the particles. The "median dimension" is the intermediately sized dimension of the three dimensions of the particle. The median dimension is determined by determining each of x, y, and z mutually perpendicular dimensions through the geometric center of the particle, where the sum of x, y and z is maximized, and taking the dimension that is intermediate in length between the lengths of the other two dimensions, as the median dimension. "Thickness" of the grain is the smallest of the x, y and z dimensions through the center of the grain. "Length" of the particle is longest of the x, y and z dimensions.

In general, a method for making the product of the invention includes the steps of:

a. forming ceramic bubbles having a diameter of between 20 and 3000 micrometers; and b. crushing the ceramic bubbles to form the product.

From about 0.3 to about 0.7 weight percent of water insoluble ceramic material may be added that melts at a temperature lower than alumina to reduce bubble wall thickness. The lower melting ceramic material may be selected from silicon dioxide, magnesium orthosilicate, and aluminum silicate. The preferred lower melting ceramic material is silicon dioxide.

Additionally, from about 0.1 to about 0.7 weight percent of oxides other than alumina and zirconia can be added to cause weakened grain boundaries to improve automatic grain sharpening.

The oxide for this purpose may, for example, be silica or magnesia.

The ceramic bubbles may be formed by a number of methods. For example, fused ceramic material may be atomized with compressed gas or sol gel ceramic bubbles formed from blown sol gel followed by sintering.

Materials that can be used to make ceramic bubbles that can be crushed in accordance with the invention include, but are not limited to: alumina, zirconia and silica and mixtures thereof including additives such as titania, and rare earth metal oxides.

Crushed Alumina Bubbles with or without additives
Crushed Alumina-Zirconia Bubbles with or without additives
Crushed Silica Bubbles with or without additives.
Crushed Alumina-Titania Bubbles.

The ceramic material of the abrasive product may be selected from fused and solidified white alumina, fused and solidified brown alumina, fused and solidified alumina-zirconia ceramic alloy, fused and solidified alumina-titania ceramic alloy, and solidified and sintered alumina sol gel.

The packing density of abrasive grains is due to a number of variables including density of the material of the grain, average grain size, grain size distribution and grain shape.

Figure 2:
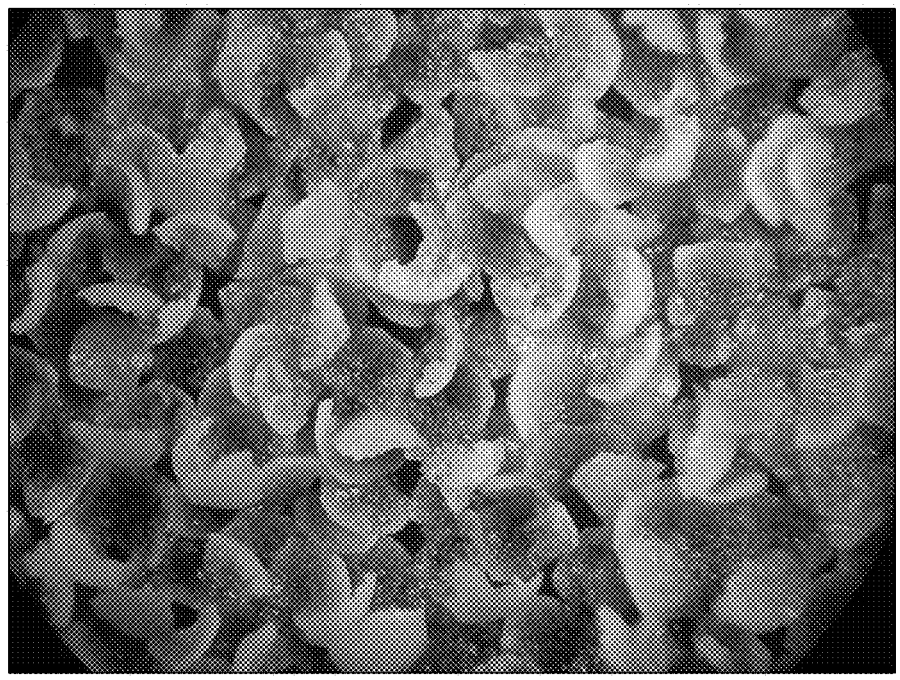
FIG. 2 shows a photomicrograph of an embodiment of abrasive grains of the invention made by crushing hollow alumina beads, i.e. "bubbles"
Figure 3:
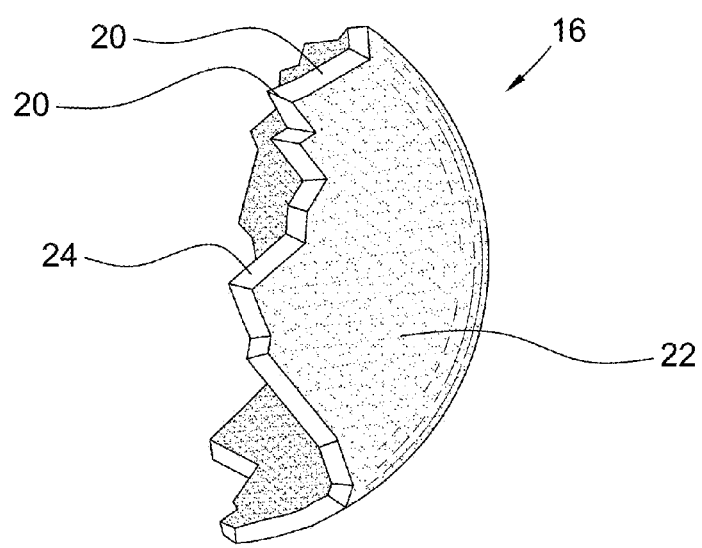
FIG. 3 shows a magnified view of an abrasive grain of the present invention indicating its curvature and sharp edges.
Figure 4:
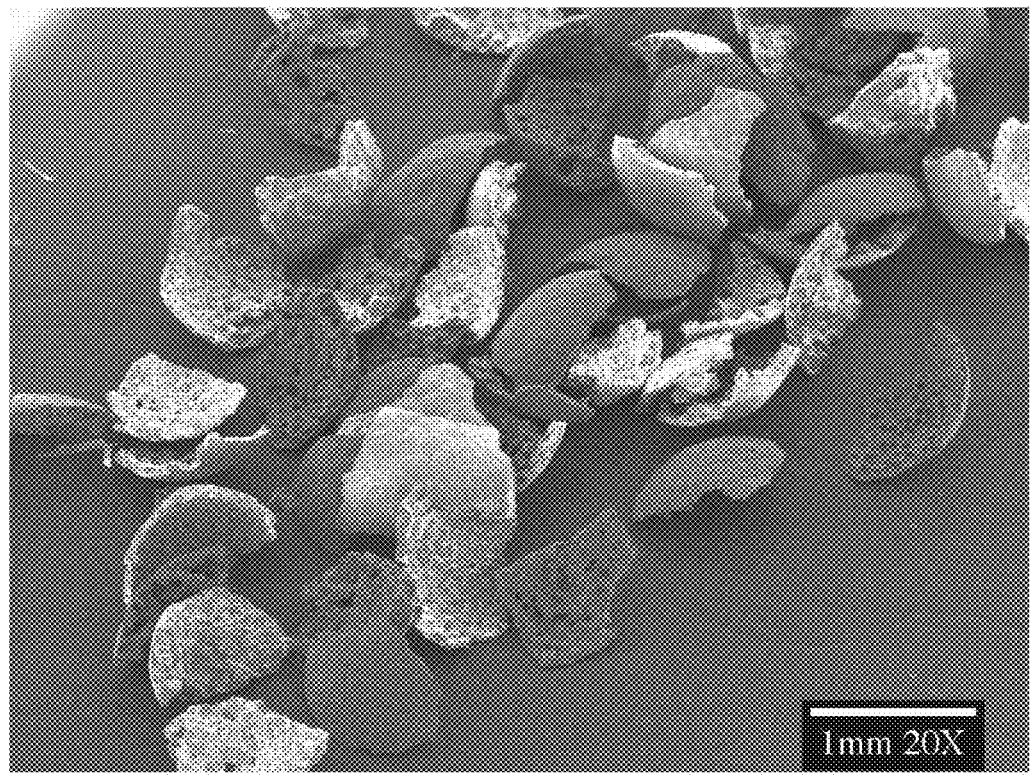
FIG. 4 shows an SEM photomicrograph of grains of the invention at 20× magnification.
Figure 5:
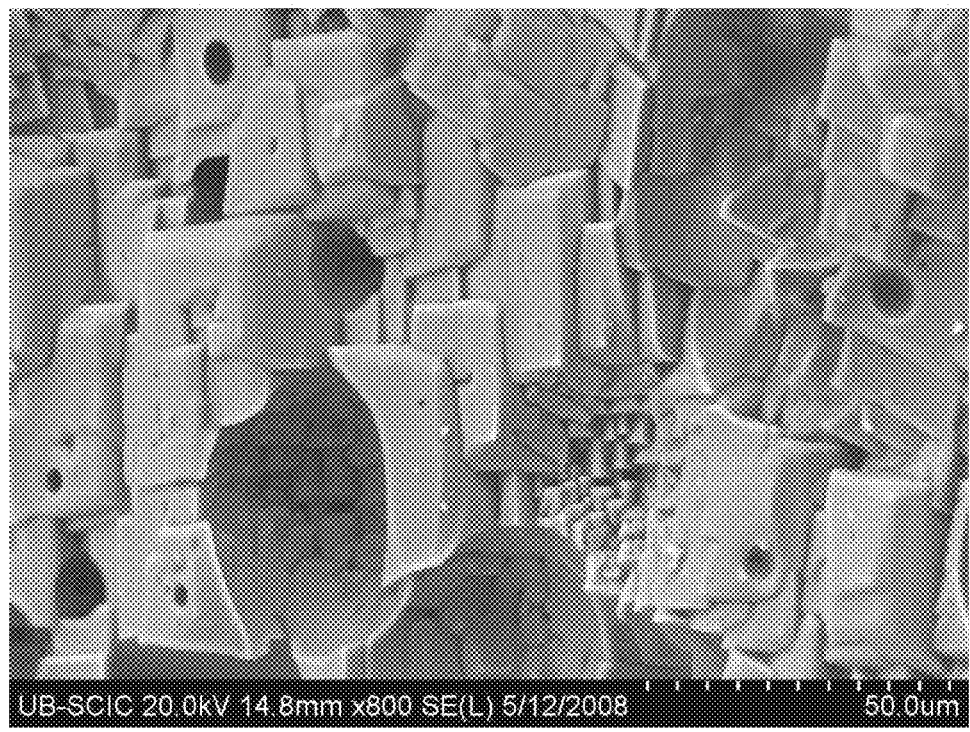
FIG. 5 shows an SEM photomicrograph at 800× showing microcrystalline structure of a grain of the invention wherein microcrystal interfaces are clearly visible that may break to expose a sharper edge.
Figure 6:
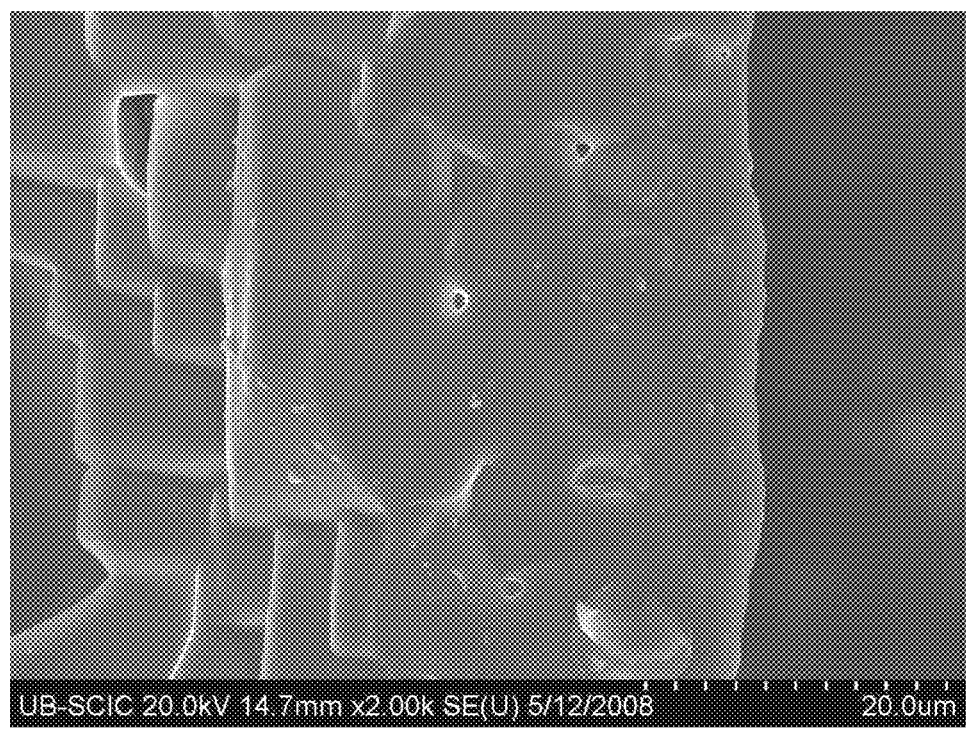
FIG. 6 shows an SEM photomicrograph at 2000× of a grain of the invention.

The packing density of the abrasive product of the invention, due to grains in the form of thin sheets having curved surfaces, is less than prior art solid abrasives having the same ceramic type composition and grain size. This same unique thin wall curved surface is believed to be responsible for the superior cutting ability of the grains of the invention providing strong grains with thin sharp cutting edges. A photomicrograph of an abrasive grain of the invention can be seen in FIG. 2 at a magnification of about 30×. FIG. 3 shows a drawing of an abrasive particle 16 of the invention showing a thickness 20, a curved surface 22 and a sharp edge 24.

As examples, abrasive product consisting essentially of crushed white or brown alumina bubbles of a diameter of up to about 3000 micrometers crushed to average particle size (as discussed above) of about 500 to 550 micrometers (36 grit) with about a 0.05 mm (0.002 inch) wall thickness, will have a packing density of from about 0.8 to about 1.5 g/cm$^3$ depending on wall thickness of the starting bubble. That wall thickness determines the thickness of the grain, which is usually about. 0.05 to about 0.4 mm (0.002 to about 0.016 inch). Typical packing densities for 36 grit alumina grain of the invention is less than 1.5 g/cm$^3$ (over about 3,000 particles per gram), preferably less than 1.3 g/cm$^3$ (over about 4,000 particles per gram) and for most applications, most preferably less than 1.1 g/cm$^3$ (over about 5,000 particles per gram). For alumina-zirconia grain made from bubbles in accordance with the invention, due to higher material density, typical packing densities for 36 grit grain is less than 1.7 g/cm$^3$ (over about 2,500 particles per gram), preferably less than 1.5 g/cm$^3$ (over about 3,000 particles per gram) and for most applications, most preferably less than 1.3 g/cm$^3$ (over about 3,500 particles per gram)

The grain of the invention is particularly suited for coated abrasive applications, e.g. sand paper, but is also well suited for bonded abrasive applications, e.g. grinding wheels, and for free cutting abrasive applications, e.g. sandblasting.

Figure 1:
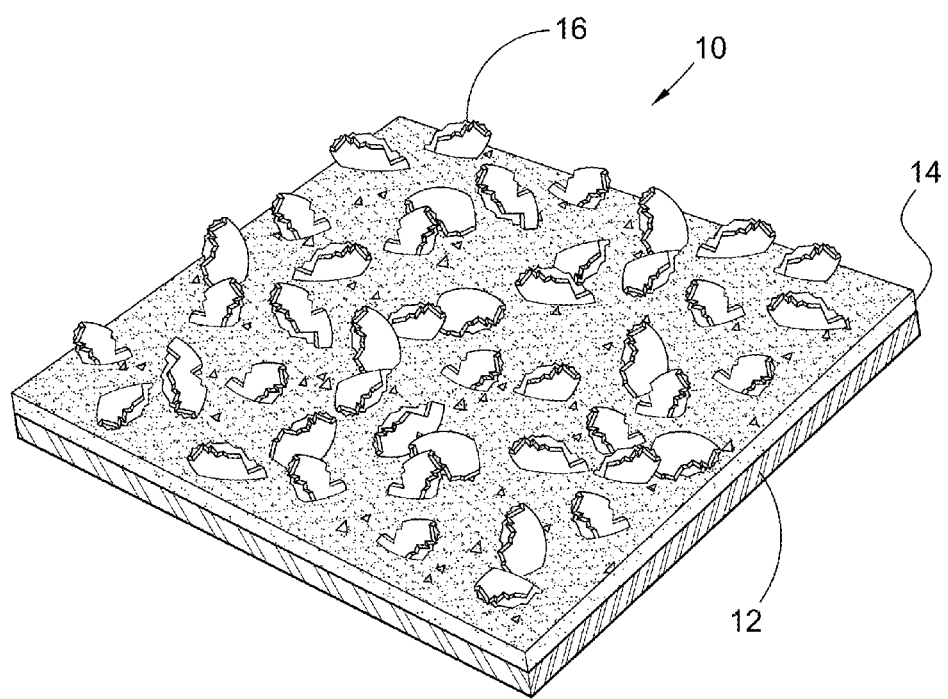
FIG. 1 shows an abrasive product coated with grains of the present invention.

Coated product 10 of the invention, as for example seen in FIG. 1, has a base sheet 12 of a fiber disc, or fabric, e.g. a woven material or flexible polymer sheet. At least one bonding layer 14, e.g. a resin layer, is on the surface of the base layer that partially embeds the abrasive grain particles 16 to hold them to the base layer. The bonding layer may be a ceramic matrix, a resin matrix or mixtures thereof. The bonding layer is usually a resin, e.g. a phenolic resin.

Bonded abrasive products of the invention are similar to a coated product, as shown in FIG. 1, except that the bonding material is usually not flexible and grains may be entirely embedded. In such a product, the flexible base layer is absent; although, reinforcing material or fabric may be embedded in the bonding layer. 13. The bonding material is usually a bonding matrix selected from the group consisting of a ceramic matrix, a resin matrix and mixtures thereof.

The invention also includes a method for abrading an article by grinding, sanding or blasting the article with an abrasive material using a material that includes the ceramic abrasive product of the invention.

EXAMPLES

The grinding results described below were generated with 7" fiber discs trimmed from 8" discs coated via conventional techniques with 36 grit materials and using KBF$_4$ in the size coat. The discs were mounted to a horizontal turntable and rotated at 2500 rpm. Stainless steel (316) bars (3/16"×1"×24") were positioned vertically in a holder above the disc with the 1" direction of the steel bar facing across the disc, in line with the central axis. The resulting wear track on the disc had an outside diameter of 6.5 inches and an inside diameter of 4.5 inches. An auxiliary weight of 8.17 lbs. was set on a holder attached to the bar. A new bar, the auxiliary weight and the holder for the auxiliary weight attached to the bar was 9.71 lbs., which applied a pressure of 51.8 psi from the steel bar to the grinding disc. A total of 12 bars with their auxiliary weight holders were used for sequential grinding for 20 second intervals. The weight loss for each set of six bars was recorded as the weight loss during a two minute period. As the bars lost weight, an equivalent weight was added to the auxiliary weight to keep the pressure applied to the disc constant.

Table II shows the cut in grams of two 36 grit (average particle size 500 to 550 microns) NZ+1585 grains made into discs which is for use in coated applications. This grain was used for a control. Also shown is an NZ+ comparable abrasive grain, ATZ-II. This second grain was separated on a diamond shape table into various shape fractions to evaluate the effect of packing density (i.e. shape or sharpness) on the cut of 316 stainless steel.

TABLE II

| | WEIGHT LOSS (CUT) OF 316SS BARS | | | | | | |
|---|---|---|---|---|---|---|---|
| | NZ+ | NZ+ | ATZ-II | | | | |
| Shape Table Compartments | NA | NA | 1-5 | 9 | 10 | 11 | 12 |
| Packing Density g/cm$^3$ | 2.01 | 2.01 | 2.16 | 2.07 | 2.00 | 1.93 | 1.82 |
| Time (Minutes) | | | | | | | |
| 2 | 25.6 | 23.9 | 16.1 | 22.8 | 28.6 | 32.8 | 35.0 |
| 4 | 13.8 | 13.4 | 9.8 | 14.4 | 14.8 | 19.6 | 22.7 |

TABLE II-continued

WEIGHT LOSS (CUT) OF 316SS BARS

| | NZ+ | NZ+ | | | ATZ-II | | |
|---|---|---|---|---|---|---|---|
| 6 | 12.4 | 8.2 | 6.5 | 10.7 | 11.5 | 15.6 | 17.7 |
| 8 | 8.6 | 6.9 | 6.0 | 7.8 | 8.9 | 12.0 | 13.3 |
| 10 | 6.8 | 5.3 | 5.7 | 6.5 | 6.8 | 9.3 | 11.6 |
| 12 | 5.3 | 4.6 | 5.1 | 5.1 | 5.2 | 7.8 | 9.7 |
| Total Cut (grams) | 72.5 | 62.3 | 49.2 | 67.3 | 75.8 | 97.1 | 110.0 |
| Dist Wt. Loss (grams) | 1.51 | 1.38 | .90 | 1.18 | 1.40 | 1.73 | 1.86 |
| Test Number | 503 | 507 | 417 | 418 | 419 | 420 | 421 |

Table II illustrates the importance of using a low packing density (sharp) commercial abrasive material to obtain higher cuts. The packing densities are illustrative of lowest available packing densities for "sharp" grains of the prior art but are not nearly as low as packing densities of grains of the present invention. The discs weight loss correlates very well with the packing densities and cuts. The blockier grains (high packing density) have a shape which results in a larger wear flat area for a specific wear back compared to sharper elongated grains which would have a smaller wear flat area for the same wear back. Thus, the blocky material, which has a higher wear flat area growth rate, also has a more rapidly declining cutting rate and a lower total cut. The smaller wear back for the blocky grains results in a lower disc weight loss. The sharper grains cut more aggressively, have a greater wear back and probably also have wear flat grains breaking off which contribute to a higher disc weight loss.

A description of the physical properties of alumina bubbles is necessary to explain the results on Table III and IIIA.

The shell thickness of alumina bubbles varies with the $SiO_2$ content and the bubble size. Generally, bubbles blown from $Al_2O_3$ fusions containing 0.3 to 0.7% $SiO_2$ have the thinnest wall thickness. As the $SiO_2$ level decreases or increases from that level, the wall thickness gradually increases. In addition, wall thickness decreases with decreasing bubble size as illustrated on the following Table IIA. As the bubble size decreases, the wall thickness decreases which results in a decreasing 36 grit packing density and an increasing number of particles per gram and fewer particles on the abrasive disc shown in Tables III and IIIA. Table IIA is for illustration only. The material is not the same material listed on Table III and IIIA.

TABLE IIA

36 GRIT (500 to 550 micrometers) FROM CRUSHED BUBBLES

| | Mesh Bubble Size | | | |
|---|---|---|---|---|
| | +5 (>4 mm) | 9/5 (2-4 mm) | 14/9 (1-2 mm) | 18/14 (0.8-1 mm) |
| .49% $SiO_2$ | | | | |
| wall thickness - inches | .008-.015 | .004-.008 | .002-.004 | Not Processed |
| particles per gram | 4096 | 5154 | 6639 | |
| 36 grit packing density | 1.20 | 1.10 | 0.89 | |
| .34% $SiO_2$ | | | | |
| wall thickness | .008-.015 | .004-.008 | .002-.004 | .002 or less |
| particles per gram | 4135 | 4956 | 6443 | 8155 |
| 36 grit packing density | 1.18 | 1.07 | .89 | .73 |
| 0% $SiO_2$ | | | | |
| wall thickness | * | * | .002-.006 | .002-.004 |
| particles per gram | | | 6055 | 6427 |
| 36 grit packing density | | | 1.05 | .97 |

* This size bubbles not available.

Table III shows the cut in grams for 36 grit NZ+ 1585, which was used as a control. Also shown are 36 and 30 grit materials made from crushed 4/10 and 10/14 alumina bubbles. Also shown is a 36 grit material made from crushed 6/14 NZ+ comparable bubbles. The grinding test for each individual grain was terminated when the cut reached approximately 5 grams in a two minute period.

TABLE III

WEIGHT LOSS (CUT) OF 316SS BARS
FOR VARIOUS BUBBLE MATERIALS

| | 36NZ+ | 36 4/10 | 30 4/10 | 36 10/14 | 30 10/14 | 36ATZ-II 6/14 |
|---|---|---|---|---|---|---|
| % $SiO_2$ | | .49 | .49 | .28 | .28 | |
| Grams of Size on 8" Disc | 32.0 | 32.0 | 39.0 | 33.0 | 37.0 | 33.0 |
| Grams of Grain on 7" Disc | 22.4 | 13.4 | 13.5 | 10.6 | 10.7 | 20.8 |
| Packing Density g/cm³ | 2.01 | 1.01 | .95 | .86 | .81 | 1.37 |
| NZ+ & ATZ-II Packing Density* | 1.59 | | | | | 1.15 |
| Particles Per Gram | 2028 | 4805 | — | 5712 | — | 3432 |
| NZ+ & ATZ-II Part. Per Gram* | 2563 | | | | | 4098 |
| Time (Minutes) | | | | | | |
| 2 | | 25.6 | 14.8 | 12.4 | 10.5 | 11.2 | 22.6 |
| 4 | | 13.8 | 14.2 | 13.0 | 11.2 | 13.5 | 17.3 |
| 6 | | 12.4 | 13.4 | 12.2 | 12.1 | 13.2 | 12.7 |
| 8 | | 8.6 | 11.7 | 10.6 | 11.3 | 12.3 | 11.0 |
| 10 | | 6.8 | 9.7 | 10.0 | 10.7 | 11.9 | 9.7 |
| 12 | | 5.3 | 8.9 | 9.2 | 9.9 | 11.1 | 8.9 |
| 14 | | | 8.0 | 8.8 | 9.9 | 10.4 | 7.9 |
| 16 | | | 7.2 | 8.2 | 9.6 | 10.1 | 7.7 |
| 18 | | | 6.3 | 7.7 | 9.1 | 9.8 | 7.5 |

TABLE III-continued

WEIGHT LOSS (CUT) OF 316SS BARS
FOR VARIOUS BUBBLE MATERIALS

|  | 36NZ+ | 36 4/10 | 30 4/10 | 36 10/14 | 30 10/14 | 36ATZ-II 6/14 |
|---|---|---|---|---|---|---|
| 20 |  | 5.7 | 7.1 | 8.9 | 9.3 | 6.5 |
| 22 |  |  | 6.9 | 8.4 | 8.7 | 6.3 |
| 24 |  |  | 6.3 | 8.3 | 8.4 | 5.8 |
| 26 |  |  | 6.1 | 8.1 | 7.9 |  |
| 28 |  |  | 5.6 | 8.1 | 7.9 |  |
| 30 |  |  | 5.5 | 7.8 | 7.2 |  |
| 32 |  |  |  | 7.5 | 6.9 |  |
| 34 |  |  |  | 7.3 | 6.6 |  |
| 36 |  |  |  | 7.1 | 6.4 |  |
| 38 |  |  |  | 7.0 | 5.9 |  |
| 40 |  |  |  | 6.7 | 5.6 |  |
| 42 |  |  |  | 6.5 |  |  |
| 44 |  |  |  | 6.3 |  |  |
| 46 |  |  |  | 6.2 |  |  |
| 48 |  |  |  | 5.7 |  |  |
| Total Cut | 72.5 | 99.9 | 129.6 | 204.2 | 184.3 | 129.4 |
| Disc Wt. Loss | 1.51 | 3.12 | 3.73 | 5.87 | 5.86 | 2.91 |
| Test No. | 503 | 562 | 558 | 565 | 564 | 568 |

36 4/10: 36 grit produced by crushing 4/10 alumina bubbles
30 4/10: 30 grit produced by crushing 4/10 alumina bubbles
36 10/14: 36 grit produced by crushing 10/14 alumina bubbles
30 10/14: 30 grit produced by crushing 10/14 alumina bubbles
36 ATZ-II: 36 grit produced by crushing 6/14 alumina-zirconia bubbles
*NZ+ and ATZ-II packing density and particles per gram adjusted to a specific gravity of 3.60, the same specific gravity of the alumina bubbles.

The grain crushed from bubbles (flakes) had a significantly higher cut than the NZ+ control, cut for a longer time and had a higher weight loss. While not wishing to be bound by any particular theory, this phenomenon is believed to result from the following:

First, it is believed that the flake shape particles have a slower wear flat growth rate with wear back as noted previously, and therefore grind for a longer time before reaching the terminal wear flat area when the grinding product is discarded.

Second, it is believed that because of the weaker shape, the wear flats may shed (ablate) as they increase in size and receive more friction force from the grinding operation, and Third, it is believed that because of the weaker shape, the grains with wear flats may break off below the grinding surface and thus allow new grains to engage the steel surface.

Shedding or ablation and breakoff can be considered self dressing, and this concept is supported by the higher disc weight loss compared with NZ+. In all test results the higher cuts always correlate with higher disc weight loss.

The grain made from the 10/14 alumina bubbles had higher cuts than the grain made from 4/10 alumina bubbles. The grain made from the 10/14 bubbles had a lower packing density, thinner walls and a larger number of particles per gram, all of which improved the cut. The grain made from the alumina-zirconia bubbles had a higher packing density, a thicker shell wall 0.005"-0.010" and fewer particles per gram. Thinner wall bubbles should achieve a higher cut. The alumina-zirconia is also believed to be a tougher material and may not break back as readily as the grain made from alumina bubbles. The lower weight loss of the ATZ-II sample on Table III (2.91 g) supports this concept.

Another important aspect of grain from crushed bubbles is that the steel surface finish is finer. The cutting edge of a grain produced from crushed bubbles is composed of micro crystals as asperites and results in a finer surface finish compared with a large single grain cutting point as in NZ+. The finer surface finish of steel using crushed bubbles allows coarser gradings to be used in the manufacture of belts and discs, i.e. 30 grit crushed alumina bubbles to replace 40 or possibly 50 grit NZ+. The surface roughness of the steel bars ground with 36 NZ+ and 30 10/14 was 2783 micro-inches and 1577 micro-inches respectively after 2 minutes of grinding and 1836 micro-inches and 730 micro-inches after 12 minutes of grinding.

From Table III, the improved performance of crushed alumina bubbles vs. NZ+ can be calculated.

$$\frac{36\ 4/10\ Alo\ \text{Cut}\ 99.9\ g}{NZ+\text{Cut}\ 72.5\ g} \times \frac{22.4\ g\ of\ NZ+\ \text{on Disc}}{13.4\ g\ of\ \text{Grain on Disc}} = 2.30$$

That is, 36 grit from 4/10 crushed alumina bubbles has a performance 230% higher than NZ+.

| Using the same procedure: | |
|---|---|
| Grain | Performance % Above 36 NZ+ |
| 36 grit crushed 4/10 alumina | 230 |
| 30 grit crushed 4/10 alumina | 297 |
| 36 grit crashed 10/14 alumina | 595 |
| 30 grit crushed 10/14 alumina | 548 |
| 36 grit crushed 6/14 alumina-zirconia | 192 |

Again, while not wishing to be bound by any particular theory, it is believed that the difference in the cut and disc weight loss phenomenon between NZ+ and the crushed bubble materials can be explained by wear flat areas. The NZ+ initially has sharper points, and therefore a smaller initial wear flat area and a higher cut. But the blockier NZ+ material has a more rapid wear flat area growth rate during wear back. In comparison, the flakes from the crushed alumina bubbles have an initial higher wear flat area, but the wear flat area growth rate is slower during wear back and/or self dressing occurs to reduce the wear flat growth rate.

Another test was designed to determine if the amount of size has an effect on cut. In previous test coating runs (before Table III) to evaluate various abrasives, 28-30 grams of size was always applied to the 8" fiber discs in two coatings, based on data in a 3M U.S. Pat. No. 4,770,671. Because of the assumed fragile nature of the crushed alumina bubble shells, it was decided to increase the amount of size on the discs in Table III to provide improved or additional support.

Table IIIA includes the same lot of 10/14 material (0.28% $SiO_2$) as in Table III with various weights of size. Included are two NZ+ discs with 21 and 28 g of size. The results indicate that for crushed bubbles there is an optimum amount of size which gives optimum performance. The NZ+ results indicate that 21, 28 or 32 g (Table III) of size has no effect on cut.

A second set of grains on Table IIIA are labeled 0% $SiO_2$. The 25 and 28 g of size on the 0% $SiO_2$ grains had a higher cut than the 25 and 28 g of size on the 0.28% $SiO_2$ samples. This was unexpected because the 0% $SiO_2$ material has a higher packing density, fewer particles per gram and slightly thicker shell walls. One explanation is that the absence of $SiO_2$ improves total cut.

The same concepts that were discussed for the fused alumina and fused alumina zirconia materials are applicable with respect to alumina sol gel here and will not be discussed again. Data will be presented which concurs and supports the concepts of the previous section.

In the first case, ribbons of composition 321 were extruded into various thicknesses, dried, crushed 18 gg×26 gg; calcined at 650° C., fired at 1370° C. for 6 minutes and graded into 36 grit.

The approximately extruded and fired thickness is shown below:

| Extruded Thickness: | .099" | .058 | .036 | .027 | .020 |
| Fired Thickness: | .015" | .010 | .0065 | .005 | .004 |

The various samples were made into coated discs via the same process as discussed previously and tested by grinding 316 stainless steel bars as discussed previously. The results are shown in Table IV. Included in the results are controls of a 3M commercial disc (985C) and 3M commercial grain (321) made into discs at the same time the ribbon discs were made.

The grinding test was terminated when the metal removal rate for a two minute interval decreased below 11 grams.

TABLE IIIA

WEIGHT LOSS (CUT) OF 316SS BARS FOR VARIOUS MATERIALS

| | 36 NZ+ | 36 NZ+ | 36 10/14 | 36 10/14 | 36 10/14 | 36 10/14 | 36 10/14 | 36 10/14 | 36 10/14 |
|---|---|---|---|---|---|---|---|---|---|
| % $SiO_2$ | | | .28 | .28 | .28 | .28 | 0 | 0 | 0 |
| Grams size on 8" disc | 28 | 21 | 21 | 25 | 28 | 31 | 23 | 25 | 28 |
| Grams grain per 7" disc | 23.4 | 24.1 | 10.2 | 10.3 | 10.3 | 10.6 | 12.4 | 13.1 | 12.5 |
| Packing density g/cm³ | 2.01 | 2.01 | .86 | .86 | .86 | .86 | 1.05 | 1.05 | 1.05 |
| Particles per gram | 2028 | 2028 | 5712 | 5712 | 5712 | 5712 | 4910 | 4910 | 4910 |
| Time (Minutes) | | | | | | | | | |
| 2 | 26.2 | 30.5 | 26.1 | 25.0 | 20.8 | 18.2 | 26.4 | 23.6 | 19.8 |
| 4 | 16.8 | 16.8 | 17.5 | 18.7 | 16.0 | 15.6 | 19.6 | 20.3 | 18.2 |
| 6 | 12.1 | 11.1 | 13.3 | 14.9 | 13.1 | 13.7 | 16.3 | 17.3 | 16.1 |
| 8 | 7.9 | 8.5 | 11.1 | 12.5 | 12.0 | 12.8 | 13.4 | 14.5 | 14.3 |
| 10 | 6.4 | 6.2 | 9.9 | 10.8 | 10.3 | 11.3 | 11.7 | 12.4 | 13.2 |
| 12 | 4.7 | 5.0 | 9.2 | 9.8 | 9.0 | 10.2 | 9.5 | 11.1 | 11.8 |
| 14 | | | 8.5 | 8.8 | 8.4 | 9.6 | 8.6 | 10.0 | 11.0 |
| 16 | | | 7.6 | 7.8 | 7.7 | 8.8 | 7.2 | 9.2 | 9.9 |
| 18 | | | 6.2 | 6.3 | 7.2 | 8.2 | 6.6 | 8.0 | 9.2 |
| 20 | | | 5.4 | 5.5 | 6.3 | 7.8 | 6.0 | 7.2 | 8.6 |
| 22 | | | 4.7 | 5.0 | 6.0 | 7.1 | 5.3 | 6.4 | 8.0 |
| 24 | | | | | 5.9 | 6.7 | | 5.8 | 7.3 |
| 26 | | | | | 5.5 | 6.2 | | 5.5 | 6.5 |
| 28 | | | | | 5.3 | 5.9 | | 5.2 | 6.2 |
| 30 | | | | | 4.9 | 5.8 | | | 5.9 |
| 32 | | | | | | 5.4 | | | 5.3 |
| 34 | | | | | | 5.2 | | | |
| Total Cut (g) | 74.1 | 78.1 | 119.5 | 125.1 | 138.4 | 158.5 | 130.6 | 146.5 | 171.3 |
| Disc Wt. Loss (g) | 1.46 | 1.68 | 3.55 | 3.57 | 3.87 | 4.36 | 3.75 | 4.03 | 4.71 |
| Test No. | 589 | 593 | 594 | 595 | 603 | 599 | 588 | 602 | 587 |
| Performance % | 100 | — | 370 | 384 | 424 | 472 | 333 | 353 | 433 |

TABLE IV

WEIGHT LOSS (CUT) OF 316SS BARS VIA 36 GRIT DISCS MADE WITH CRUSHED RIBBONS

|  | 3M 985C | 3M 321 | WM** 321 |  |  |  |  |  |
|---|---|---|---|---|---|---|---|---|
| Extruded Thickness | — | — | — | .099 | .058 | .036 | .027 | .020 |
| Fired Thickness | — | — | — | .015 | .010 | .0065 | .005 | .004 |
| Grams on Grain on Disc | 19* | 19 | 19 | 19 | 19 | 19 | 18 | 17 |
| Packing Density g/cm³ | — | 1.81 | 1.63 | 1.70 | 1.72 | 1.59 | 1.43 | 1.33 |
| Particles Per Gram | NA | 2726 | 3050 | 2874 | 2842 | 3212 | 4000 | 4351 |
| Time (Minutes) |  |  |  |  |  |  |  |  |
| 2 | 54.2 | 40.2 | 54.7 | 31.2 | 40.0 | 45.5 | 40.1 | 43.5 |
| 4 | 20.1 | 26.0 | 36.8 | 22.8 | 29.4 | 30.6 | 33.6 | 32.2 |
| 6 | 12.3 | 22.7 | 24.5 | 20.2 | 25.2 | 27.0 | 29.2 | 27.3 |
| 8 | 8.7 | 16.4 | 19.0 | 19.9 | 23.6 | 24.9 | 24.9 | 26.5 |
| 10 | 8.1 | 12.2 | 13.2 | 16.5 | 18.4 | 23.1 | 20.9 | 23.3 |
| 12 | 7.8 | 9.4 | 11.2 | 17.1 | 16.0 | 18.2 | 19.1 | 20.9 |
| 14 |  |  | 10.0 | 12.5 | 13.2 | 15.6 | 17.7 | 18.4 |
| 16 |  |  |  | 12.2 | 11.4 | 12.4 | 14.7 | 15.8 |
| 18 |  |  |  | 10.4 | 9.7 | 10.5 | 12.8 | 15.0 |
| 20 |  |  |  |  |  |  | 10.5 | 13.2 |
| 22 |  |  |  |  |  |  |  | 11.6 |
| 24 |  |  |  |  |  |  |  |  |
| g. Total Cut | 111.2 | 126.9 | 169.4 | 162.8 | 186.9 | 207.8 | 224.1 | 247.7 |
| g. Disc Wt. Loss | 1.64 | 2.25 | 2.68 | 2.84 | 2.79 | 3.45 | 4.37 | 4.82 |
| Test No. | 404 | 521 | 393 | 500 | 502 | 512 | 519 | 528 |
| Performance % |  | 100 | 133 | 128 | 147 | 164 | 197 | 247 |

*Approximately 30% of the grain on this disc was 40 grit fused brown aluminum oxide
**A 3M 321 equivalent composition made by Washington Mills Electro Minerals The 985 C commercial disc had a high initial cut which is typical of a sharper grain. However, the 985C disc had a very rapid cut decay and a very low weight loss which is typical of blocky grain. The packing density of the sol gel grain on this disc could not be determined because it was mixed with approximately 30% brown aluminum oxide.

The commercial 3M 321 grain was used as a control for the remaining grains in the series. The grain labeled WM 321 was an equivalent composition similar to the 3M 321 but was much sharper and crushed from the crude material via a special technique. This sharper grain resulted in a higher cut and also a higher disc weight loss.

As the extrusion thickness of the ribbon grain decreased, the packing density decreased the particles per gram increased, the cut increased and the disc weight loss increased. Thus when an abrasive disc or belt is made from 0.020" extruded material, the cut will be much higher and 20-30% of the abrasive will be consumed compared to 10-20% for discs or belts made with conventional abrasives.

The product made with the extruded ribbons had improved cut relative to commercial alumina abrasive products but the performance factor of the extruded ribbons was not nearly as good as the performance factor of the low bulk density ceramic bubble grain of the invention previously described.

In a further test, fine rods were extruded via a die with multiple holes of 0.031". The dried material was partially crushed, calcined at 650° C., then further crushed by hand rubbing on a 14 mesh round 8" U.S. standard screen. Below this 14 mesh screen was a screen stack, 20, 25, 30, 35, 40, 45, 50 Pan. The rods were then screen categorized and fired at 1370° C. for six minutes. The rod diameter was approximately 0.007".

| U.S. Screens | Average Length |
|---|---|
| 25-30 | .080-.090 |
| 30-35 | .060-.070 |
| 35-40 | .060-.070 |
| 40-45 | .050-.060 |
| 45-50 | .030-.040 |
| Pan |  |

The rods were used as the above fractions and were not graded into 36 grit. The grinding results are shown on Table V. Some discs were made with combinations of rods and ribbons and rods and 321 WM.

TABLE V

WEIGHT LOSS (CUT) OF 316SS BARS VIA DISCS MADE WITH RODS OR RODS AND RIBBONS

|  | Rod Size U.S. Sieves |  |  |  |  |  |  |
|---|---|---|---|---|---|---|---|
|  | 3M 321 | 45-50 | 40-45 |  | 30-40 |  | 25-30 |
| Grams of Rods | 19* | 10.7 | 20.3 | 7.9 | 7.7 | 11.5 | 17.1 |
| Grams of .020" Ribbons |  |  |  | 9.1 |  |  |  |
| Grams of WM 321 |  | 9.3 |  |  | 12.8 | 8.6 |  |
| Packing Density of Rods | 1.81* | 1.54 | 1.54 |  | 1.49 |  | 1.47 |

TABLE V-continued

WEIGHT LOSS (CUT) OF 316SS BARS VIA DISCS MADE WITH RODS OR RODS AND RIBBONS

| | Rod Size U.S. Sieves | | | | | |
|---|---|---|---|---|---|---|
| | 3M 321 | 45-50 | 40-45 | | 30-40 | | 25-30 |

| Time (Minutes) | | | | | | | |
|---|---|---|---|---|---|---|---|
| 2 | 40.2 | 29.6 | 17.0 | 36.1 | 27.1 | 31.9 | 24.0 |
| 4 | 26.0 | 26.6 | 19.9 | 33.0 | 24.9 | 29.0 | 21.3 |
| 6 | 22.7 | 23.6 | 20.4 | 27.2 | 20.6 | 26.9 | 18.6 |
| 8 | 16.4 | 21.8 | 18.8 | 23.7 | 19.6 | 24.4 | 17.4 |
| 10 | 12.2 | 20.4 | 19.0 | 23.5 | 17.8 | 21.5 | 14.6 |
| 12 | 9.4 | 18.6 | 15.8 | 23.2 | 17.0 | 21.3 | 12.9 |
| 14 | | 18.1 | 16.0 | 21.6 | 16.7 | 19.2 | 12.9 |
| 16 | | 15.0 | 14.7 | 18.9 | 15.9 | 18.0 | 13.7 |
| 18 | | 14.0 | 13.8 | 17.1 | 15.7 | 17.6 | 13.8 |
| 20 | | 12.1 | 13.5 | 16.0 | 15.1 | 16.1 | 12.9 |
| 22 | | 11.5 | 12.3 | 14.3 | 14.0 | 16.5 | 11.1 |
| 24 | | 9.8 | 11.2 | 12.2 | 13.9 | 16.0 | 11.0 |
| 26 | | | 10.5 | 10.8 | 13.4 | 15.5 | 10.6 |
| 28 | | | | | 13.4 | 14.1 | |
| 30 | | | | | 13.6 | 13.7 | |
| 32 | | | | | 13.0 | 13.4 | |
| 34 | | | | | 13.2 | 12.0 | |
| 36 | | | | | 11.8 | 11.2 | |
| 38 | | | | | 10.9 | 10.7 | |
| Total Cut | 126.9 | 221.0 | 202.9 | 277.6 | 307.7 | 348.0 | 209.5 |
| Disc Wt. Loss | 2.25 | 4.21 | 4.98 | 5.86 | 5.95 | 7.56 | 5.08 |
| Test No. | 521 | 548 | 549 | 550 | 554 | 555 | 575 |
| Performance % | 100 | 165 | 150 | 244 | 225 | 259 | 183 |

Performance calculated via cut and grams of grain on disc.
*grams and packing density of grain - not rods In all cases, the cuts and disc weight losses were higher to much higher than the 3M 321 control. Again, this cut was superior but still not as good as the crushed alumina bubbles as previously described. The believed explanation is as before, slower wear flat growth rate and self dressing, both of which contribute to a longer life and higher cut.

Mixtures of rods and ribbons or rods and WM 321 had higher cuts than rods alone and also had the highest disc weight loss. This could be the result of ribbons and WM 321 providing support for the rods during grinding. There also may be a synergistic effect which promotes self dressing.

The discs in this series had extra size material which may have contributed a small amount to the higher disc weight loss.

What is claimed is:

1. A coated abrasive product comprising a sheet material having ceramic abrasive grain product partially embedded in a resin layer on a base layer wherein the ceramic abrasive grain product comprises at least fifty percent of abrasive grains having a uniform grain thickness of from 0.002 to 0.016 inches, wherein the thickness is the smallest uniform dimension, and a length, bigger than the thickness, and the grain is partially embedded in the resin on the base layer such that the grain is oriented such that the thickness of the grain is exposed to a workpiece.

2. A method for abrading an article comprising grinding or sanding the article with an abrasive material comprising a coated abrasive product of claim 1.

3. A method for manufacturing a ceramic abrasive grain product of a ceramic material composition, said ceramic abrasive grain product comprising at least fifty percent of abrasive grains having a uniform grain thickness of from 0.002 to 0.016 inches, wherein the thickness is the smallest uniform dimension, and a length, bigger than the thickness, such that the grain is self dressing when oriented such that the thickness of the grain is exposed to a workpiece comprising:
   a. extruding a sol gel in the form of a filament, rod or ribbon having a uniform thickness permitting firing to a uniform thickness of from 0.002 to 0.016 inches
   b. firing to a uniform thickness of from 0.002 to 0.016 inches; and
   c. crushing the fired filament, rod or ribbon to form the product.

* * * * *